US012582966B2

(12) United States Patent
Ifrah et al.

(10) Patent No.: US 12,582,966 B2
(45) **Date of Patent: \*Mar. 24, 2026**

(54) CERIUM- AND ZIRCONIUM-BASED MIXED OXIDES

(71) Applicant: RHODIA OPERATIONS, Paris (FR)

(72) Inventors: Simon Ifrah, La Jarrie (FR); Wie Li, Shanghai (CN); Valérie Buissette, Paris (FR); Stéphane Denaire, Jouy-le-Moutier (FR); Rui Miguel Jorge Coelho Marques, Shanghai (CN)

(73) Assignee: RHODIA OPERATIONS, Paris (FR)

( * ) Notice: Subject to any disclaimer, the term of this patent is extended or adjusted under 35 U.S.C. 154(b) by 191 days.

This patent is subject to a terminal disclaimer.

(21) Appl. No.: 16/096,279

(22) PCT Filed: Apr. 26, 2016

(86) PCT No.: PCT/CN2016/080194
§ 371 (c)(1),
(2) Date: Oct. 24, 2018

(87) PCT Pub. No.: WO2017/185224
PCT Pub. Date: Nov. 2, 2017

(65) Prior Publication Data
US 2019/0134608 A1      May 9, 2019

(51) Int. Cl.
| | |
|---|---|
| *B01J 23/00* | (2006.01) |
| *B01D 53/94* | (2006.01) |
| *B01J 21/06* | (2006.01) |
| *B01J 23/10* | (2006.01) |
| *B01J 23/63* | (2006.01) |
| *B01J 35/10* | (2006.01) |
| *B01J 35/61* | (2024.01) |
| *B01J 35/63* | (2024.01) |
| *B01J 35/64* | (2024.01) |
| *B01J 37/00* | (2006.01) |
| *B01J 37/02* | (2006.01) |
| *B01J 37/03* | (2006.01) |
| *B01J 37/08* | (2006.01) |
| *C01G 25/00* | (2006.01) |

(52) U.S. Cl.
CPC ............ *B01J 23/002* (2013.01); *B01D 53/94* (2013.01); *B01J 21/06* (2013.01); *B01J 21/066* (2013.01); *B01J 23/10* (2013.01); *B01J 23/63* (2013.01); *B01J 35/613* (2024.01); *B01J 35/633* (2024.01); *B01J 35/635* (2024.01); *B01J 35/647* (2024.01); *B01J 37/0018* (2013.01); *B01J 37/0201* (2013.01); *B01J 37/03* (2013.01); *B01J 37/035* (2013.01); *B01J 37/082* (2013.01); *C01G 25/006* (2013.01); *B01D 53/9422* (2013.01); *B01D 53/944* (2013.01); *B01D 2255/2061* (2013.01); *B01D 2255/2063* (2013.01); *B01D 2255/2068* (2013.01); *B01D* *2255/407* (2013.01); *B01D 2255/9207* (2013.01); *B01D 2258/012* (2013.01); *B01J 2523/00* (2013.01); *B01J 2523/18* (2013.01); *B01J 2523/25* (2013.01); *B01J 2523/36* (2013.01); *B01J 2523/3706* (2013.01); *B01J 2523/3712* (2013.01); *B01J 2523/48* (2013.01); *C01P 2006/12* (2013.01); *C01P 2006/14* (2013.01); *C01P 2006/16* (2013.01)

(58) Field of Classification Search
CPC .. B01J 21/066; B01J 35/1038; B01J 35/1061; B01J 2523/00; B01J 2523/36; B01J 2523/3706; B01J 2523/3712; B01J 2523/48; B01D 2255/407; C01G 25/006
See application file for complete search history.

(56) References Cited

U.S. PATENT DOCUMENTS

| | | | | |
|---|---|---|---|---|
| 6,171,572 B1 * | 1/2001 | Aozasa | .................. | C01G 25/00 |
| | | | | 423/594.12 |
| 8,956,994 B2 | 2/2015 | Ifrah et al. | | |
| 10,350,578 B2 * | 7/2019 | Larcher | .................. | B01J 37/031 |
| 2007/0148072 A1 * | 6/2007 | Okamoto | ............... | C01G 25/00 |
| | | | | 423/263 |
| 2007/0264174 A1 * | 11/2007 | Willigan | .................. | B01J 37/03 |
| | | | | 422/222 |
| 2008/0090723 A1 * | 4/2008 | Okamoto | ............. | C01G 25/006 |
| | | | | 502/304 |
| 2009/0274599 A1 * | 11/2009 | Larcher | ................ | B01J 35/1014 |
| | | | | 423/213.2 |
| 2010/0040523 A1 | 2/2010 | Larcher et al. | | |
| 2010/0329954 A1 * | 12/2010 | Yokota | .................. | B01J 23/002 |
| | | | | 423/213.2 |
| 2013/0023410 A1 | 1/2013 | Schoneborn et al. | | |

(Continued)

FOREIGN PATENT DOCUMENTS

| | | |
|---|---|---|
| CN | 101448569 A | 6/2009 |
| CN | 101511479 A | 8/2009 |

(Continued)

*Primary Examiner* — Jun Li

(74) *Attorney, Agent, or Firm* — Osha Bergman Watanabe & Burton LLP

(57) ABSTRACT

Disclosed is a composition comprising at least a cerium and zirconium based mixed oxide comprising zirconium, cerium, lanthanum and optionally at least one rare earth other than cerium and lanthanum; said mixed oxide exhibiting a high thermal resistance and are in particular capable of maintaining a large specific surface area even in a high temperature environment. Also disclosed is a process for the synthesis of such compositions.

16 Claims, No Drawings

(56)                References Cited

U.S. PATENT DOCUMENTS

| | | | | |
|---|---|---|---|---|
| 2013/0029840 A1* | 1/2013 | Morikawa | ........... | C04B 35/6262 |
| | | | | 502/304 |
| 2013/0121902 A1* | 5/2013 | Adelmann | ............... | B01J 23/20 |
| | | | | 502/65 |
| 2013/0142713 A1 | 6/2013 | Ifrah et al. | | |
| 2013/0336864 A1* | 12/2013 | Zheng | ................. | B01J 35/1047 |
| | | | | 423/213.5 |
| 2014/0072492 A1 | 3/2014 | Ifrah et al. | | |
| 2014/0147357 A1* | 5/2014 | Ifrah | ..................... | B01J 35/023 |
| | | | | 423/213.2 |

FOREIGN PATENT DOCUMENTS

| | | | | | |
|---|---|---|---|---|---|
| CN | 102247826 | A | | 11/2011 | |
| CN | 102883808 | A | | 1/2013 | |
| CN | 103191712 | A | | 7/2013 | |
| EP | 1921044 | A2 | | 5/2008 | |
| EP | 2177258 | B1 * | 4/2016 | ............ | B01J 35/393 |
| JP | 3595874 | B2 * | 12/2004 | | |
| JP | 2009526729 | A | | 7/2009 | |
| JP | 2011121851 | A | | 6/2011 | |
| JP | 2013525255 | A | | 6/2013 | |
| JP | 2014522801 | A | | 9/2014 | |
| JP | 2014534938 | A | | 12/2014 | |
| RU | 2292236 | C2 | | 1/2007 | |
| RU | 2445268 | C2 | | 3/2012 | |
| RU | 2551381 | C2 | | 5/2015 | |
| WO | WO-03082741 | A1 * | 10/2003 | ............ | B82Y 30/00 |
| WO | 2013007809 | A1 | | 1/2013 | |
| WO | WO-2016037059 | A1 * | 3/2016 | .......... | B01D 53/945 |

* cited by examiner

CERIUM- AND ZIRCONIUM-BASED MIXED OXIDES

CROSS-REFERENCE TO RELATED APPLICATIONS

The present application is a U.S. national phase entry under 35 U.S.C. § 371 of International Application No. PCT/CN2016/080194, filed on 26 Apr. 2016, the entire content of this application is explicitly incorporated herein by reference.

The present invention concerns a composition comprising at least a cerium- and zirconium-based mixed oxide comprising zirconium, cerium, lanthanum and optionally at least one rare earth other than cerium and lanthanum; said mixed oxide exhibiting a high thermal resistance and are in particular capable of maintaining a large specific surface area even in use in a high temperature environment. The invention also concerns a process for the synthesis of such compositions.

PRIOR ART

The following discussion of the prior art is provided to place the invention in an appropriate technical context and enables the advantages of it to be more fully understood. It should be appreciated, however, that any discussion of the prior art throughout the specification should not be considered as an express or implied admission that such prior art is widely known or forms part of common general knowledge in the field.

Catalysts for purifying vehicle exhaust gas are composed of a catalytic metal such as platinum, palladium, or rhodium, and a co-catalyst for enhancing the catalytic action of such metal, both supported on a catalyst support made of, for example, alumina or cordierite. As such a co-catalyst material are used cerium oxide-containing materials, which have the properties of absorbing oxygen under the oxidizing atmosphere and desorbing oxygen under the reducing atmosphere, originated in cerium oxide, i.e., oxygen absorbing and desorbing capability. With this oxygen absorbing and desorbing capability, the cerium oxide-containing materials purify noxious components in exhaust gas such as hydrocarbons, carbon monoxide, and nitrogen oxides at excellent efficiency. As such, large quantities of the cerium oxide-containing materials are used as a co-catalyst.

It is most critical for activating the function of such cerium oxide-containing co-catalyst material to keep the co-catalyst at a high temperature. Low temperature of the catalyst, for example at engine start-up, will result in low purifying efficiency. Vehicle manufacturers are presently trying to solve this problem by placing the catalyst system close to the engine for introducing hot exhaust gas right after its emission from the engine into the catalyst system. There is also a demand for co-catalyst materials that are activated at lower temperatures.

In general, efficiency of exhaust gas treatment with a catalyst is proportional to the contact area between the active phase of the catalyst and the exhaust gas, and to the oxygen absorbing and desorbing capability of the co-catalyst material, such as cerium oxide. Thus the co-catalyst material is required to have a sufficiently large specific surface area and a sufficiently high oxygen absorbing and desorbing capability, as well as high activity at lower temperatures.

For solving these problems, U.S. Pat. No. 7,361,322 B2 proposes a method for obtaining a cerium oxide having good heat resistance with a specific surface area higher than 30 $m^2/g$ after calcination at 900° C. for 5 hours, especially around 40-50 $m^2/g$.

However it appears that heat resistance of specific surface area of these cerium oxides obtained by this process are still not sufficient.

Doping cerium with various elements is also known for these applications for several purposes, such as for its oxygen ion conduction which is thought to be of interest to improve oxygen storage capacity on specific catalysis applications, notably CSF and DOC. However, it appears that doping cerium will lead to a drastic decrease of the specific surface area of these compounds over time and temperature, showing then a low thermal stability. For instance WO03037506 application discloses Ce/Zr/RE mixed oxides having a low specific surface area of 31 $m^2/g$ after calcination at 950° C. and WO2014/122140 application describes ZrCeLaNd mixed oxides with a serious drop of over time and temperature, eg. a specific surface area of 25 $m^2/g$ after calcination at 1100° C.

It is thus understood that the development of cerium mixed oxides able to reach sufficient properties in various applications such as in catalysis while maintaining a sufficient thermal stability is a complex problem.

There is still a need to provide cerium oxides having higher thermal stability and oxygen absorbing and desorbing capability useful as a catalyst or a co-catalyst material suitable for a catalyst, such as for purifying exhaust gas.

INVENTION

The present invention concerns a composition comprising at least a cerium- and zirconium-based mixed oxide comprising zirconium, cerium, lanthanum and optionally at least one rare earth other than cerium and lanthanum; said mixed oxide exhibiting a specific surface area (SBET) comprised between 35 and 50 $m^2/g$, after calcination at 1100° C. for 4 hours under air; preferably comprised between 40 and 50 $m^2/g$.

More specifically, the present invention concerns a comprising at least a cerium- and zirconium-based mixed oxide consisting of cerium, zirconium, lanthanum, and optionally at least one rare earth other than cerium and lanthanum; said mixed oxide exhibits a specific surface area (SBET) comprised between 35 and 50 $m^2/g$, after calcination at 1100° C. for 4 hours under air, preferably comprised between 40 and 50 $m^2/g$.

The present invention also concerns a composition consisting of cerium oxide, zirconium oxide, lanthanum oxide, and optionally at least one rare earth oxide other than cerium oxide and lanthanum oxide; said mixed oxide exhibits a specific surface area (SBET) comprised between 35 and 50 $m^2/g$, after calcination at 1100° C. for 4 hours under air, preferably comprised between 40 and 50 $m^2/g$.

It is then an object of the present invention to provide cerium, zirconium, lanthanum-based mixed oxides that have excellent heat resistance, and particularly suitable for use as a catalyst support or catalyst material, particularly in catalysis for purifying vehicle exhaust gas.

Mixed oxides of the present invention also provide high heat resistance allowing an efficient exhaust gas treatment. Mixed oxides of the invention are in particular capable of maintaining a large specific surface area even in use in a high temperature environment. Mixed oxides are also capable of exhibiting high oxygen absorbing and desorbing capability in a lower temperature range.

Mixed oxide of the invention also provide a high $NO_x$ capture performance, permitting then reduction of $NO_x$ emission from automobiles in order to follow stringent pollutants regulations. These mixed oxides are then also useful for $NO_x$ trap (LNT) catalysts.

The present invention also concerns a process for the production of a composition according to the invention comprising in this order at least the following steps:

(a) reacting a basic compound with an aqueous solution comprising at least a zirconium chloride salt, a cerium salt and optionally at least one rare earth salt other than cerium salt and lanthanum salt, said aqueous solution containing sulphate anion ($SO_4^2$), to form a hydroxide precipitate;

(b) separating off the precipitate from the liquid medium;

(c) heating the precipitate obtained in step (b) in an aqueous medium and optionally in presence of lanthanum salt with a basic compound;

(d) optionally adding lanthanum salt, optionally with a basic compound;

(e) adding an organic texturing agent;

(f) separating off the precipitate from the liquid medium; and (g) calcining the precipitate.

The invention also concerns compositions susceptible to be obtained by this process.

Other characteristics, details and advantages of the invention will emerge even more fully upon reading the description which follows.

DEFINITIONS

Throughout the description, including the claims, the term "comprising one" should be understood as being synonymous with the term "comprising at least one", unless otherwise specified, and "between" should be understood as being inclusive of the limits.

It is specified that, in the continuation of the description, unless otherwise indicated, the values at the limits are included in the ranges of values which are given.

The proportions for the gases and the mixtures of gases are given in % vol. The volume flow rates and the % vol. are given at 1 atm and 20° C.

It should be noted that in specifying any range of concentration, any particular upper concentration can be associated with any particular lower concentration.

The contents are given as oxides, unless otherwise indicated. Oxide refers there to final mixed oxide defined as integration of various element oxides composing the composition.

The term "consisting of" means the embodiment necessarily includes the listed components and may also include additional unrecited oxide elements such as impurities, which may specifically originate from its preparation method, for example raw materials or starting reactants used, notably in an amount less than 2% by weight, more preferably less than 1% by weight, of the total mixed oxide. $HfO_2$ may be for instance cited as an additional element in the mixed oxide. Proportions of impurities may be determined using the inductively coupled plasma mass spectrometry.

In the continuation of the description, the term "specific surface area" is understood to mean the BET specific surface area determined by nitrogen adsorption in accordance with standard ASTM D 3663-78 laid down from the Brunauer-Emmett-Teller method described in the periodical "The Journal of the American Chemical Society, 60, 309 (1938)". Specific surface areas are expressed for a designated calcination temperature and time.

The calcinations, at the end of which the surface area values are given, are calcinations in air. Furthermore, the specific surface area values which are indicated for a given temperature and a given time correspond, unless otherwise indicated, to calcinations at a temperature held over the time indicated.

A rare earth element (REE) or rare earth metal (REM), as defined by IUPAC, is one of a set of seventeen chemical elements in the periodic table, specifically the fifteen lanthanides, as well as scandium and yttrium. Rare earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pin), samarium (Sin), scandium (Sc), terbium (Tb), thulium (Tin), ytterbium (Yb) and yttrium (Y).

As used herein, the term "hydrocarbon group" refers to a group mainly consisting of carbon atoms and hydrogen atoms, which group may be saturated or unsaturated, linear, branched or cyclic, aliphatic or aromatic. Hydrocarbon groups of the present invention may be alkyl groups, alkenyl groups, alkynyl groups, aryl groups, alkylaryl groups, arylalkyl groups, heterocyclic groups, and/or alkylheterocyclic groups.

As used herein, the terminology "$(C_n\text{-}C_m)$" in reference to an organic group, wherein n and in are each integers, indicates that the group may contain from n carbon atoms to in carbon atoms per group.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. The term "aliphatic group" includes organic moieties characterized by straight or branched-chains, typically having between 1 and 22 carbon atoms. In complex structures, the chains may be branched, bridged, or cross-linked. Aliphatic groups include alkyl groups, alkenyl groups, and alkynyl groups.

As used herein, "alkenyl" or "alkenyl group" refers to an aliphatic hydrocarbon radical which can be straight or branched, containing at least one carbon-carbon double bond. Examples of alkenyl groups include, but are not limited to, ethenyl, propenyl, n-butenyl, i-butenyl, 3-methylbut-2-enyl, n-pentenyl, heptenyl, octenyl, decenyl, and the like. The term "alkynyl" refers to straight or branched chain hydrocarbon groups having at least one triple carbon to carbon bond, such as ethynyl.

The term "aryl group" includes unsaturated and aromatic cyclic hydrocarbons as well as unsaturated and aromatic heterocycles containing one or more rings. Aryl groups may also be fused or bridged with alicyclic or heterocyclic rings that are not aromatic so as to form a polycycle, such as tetralin. An "arylene" group is a divalent analog of an aryl group.

The term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Additionally, heterocyclic groups, such as pyrrolyl, pyridyl, isoquinolyl, quinolyl, purinyl, and furyl, may have aromatic character, in which case they may be referred to as "heteroaryl" or "heteroaromatic" groups.

DETAILS OF THE INVENTION

Compositions

Cerium- and zirconium-based mixed oxide of the invention preferably comprises:

5-70% by weight of cerium, preferably 10-50% by weight of cerium;
    20-80% by weight of zirconium, preferably 30-70% by weight of zirconium;
    1-15% by weight of lanthanum, preferably 2-10% by weight of lanthanum; and
    0-20% by weight of at least one rare earth other than cerium and lanthanum; expressed as oxides.

These elements are generally present as oxides. However, it is not excluded that they may be present at least partly in the form of hydroxides or oxyhydroxides. The proportions of these elements can be determined using a standard analytical techniques in laboratories, including X-ray fluorescence (XRF), for example using the PANalytical Axios-Max spectrometer. Preferably cerium is cerium oxide, zirconium is zirconium oxide, lanthanum is lanthanum oxide and the optional rare earth is a rare earth oxide other than cerium oxide and lanthanum oxide.

Cerium- and zirconium-based mixed oxide preferably comprises:

5-70% by weight of cerium oxide;
    20-80% by weight of zirconium oxide;
    1-15% by weight of lanthanum oxide; and
    0-20% by weight of at least one rare earth other oxide than cerium oxide and lanthanum oxide; expressed as oxides.

Cerium- and zirconium-based mixed oxide may comprise, preferably consist of:

5-70% by weight of cerium oxide, preferably 10-50% by weight of cerium oxide, and
    20-80% by weight of zirconium oxide, preferably 30-70% by weight of zirconium oxide, and
    1-15% by weight of lanthanum oxide, preferably 2-10% by weight of lanthanum oxide.

Cerium- and zirconium-based mixed oxide may also comprise one or several rare earth other than cerium and lanthanum, such as one rare earth, two rare earths or three rare earths. It may be yttrium, neodymium, and/or praseodymium. Preferably it may be yttrium oxide, neodymium oxide, and/or praseodymium oxide.

Cerium- and zirconium-based mixed oxide may comprise between 1 and 20% by weight of one or several rare earths other than cerium and lanthanum, expressed as oxides; such as 1 and 20% by weight of one or several rare earth oxides other than cerium oxide and lanthanum oxide. Cerium- and zirconium-based mixed oxide may for instance comprise between 1 and 15% by weight of a rare earth oxide other than cerium oxide and lanthanum oxide, such as yttrium oxide, neodymium oxide, and/or praseodymium oxide.

Preferably, the cerium- and zirconium-based mixed oxide of the invention does not comprise between 1 and 15% by weight of tin oxide, expressed as oxides. More preferably, the composition of the invention does not comprise between 1 and 15% by weight of tin oxide, expressed as oxides with respect to the total weight of the composition.

For instance, the cerium- and zirconium-based mixed oxide of the present invention may comprise:

1-10% by weight of a first rare earth oxide other than cerium oxide and lanthanum oxide, such as neodymium oxide or praseodymium oxide, and
    1-15% by weight of a second rare earth oxide other than cerium oxide and lanthanum oxide, such as yttrium oxide.

Cerium- and zirconium-based mixed oxide may comprise, preferably consist of:

10-50% by weight of cerium oxide,
    30-80% by weight of zirconium oxide,
    1-10% by weight of lanthanum oxide, and
    1-15% by weight of a rare earth oxide other than cerium oxide and lanthanum oxide.

In a preferred embodiment of the present invention the cerium- and zirconium-based mixed oxide comprises more zirconium oxide than cerium oxide, as expressed in weight. Notably the weight ratio of zirconium oxide to cerium oxide may be comprised between 1.0 and 9.0.

According to one embodiment, the total amount of Fe, Cu, Mo, W, Cr, V, Mn, Co, Ni, Bi, Nb, Ti, and Sn in the mixed oxide is less than 0.1% by weight or 0.01% by weight, this proportion being expressed with respect to the total weight of the mixed oxide.

According to another embodiment, the total proportion of the elements Rh, Pd, Pt, Ag, Au, Ir, Ru and Os in the mixed oxide is less than 0.01% by weight or 0.001% by weight, this proportion being expressed relative to the total weight of the mixed oxide. More particularly, the mixed oxide does not contain any of these metals.

Mixed oxides of the present invention preferably have a specific surface area (SBET) comprised between 55 and 70 $m^2/g$, after calcination at 1000° C. for 4 hours under air, preferably comprised between 60 and 70 $m^2/g$.

Mixed oxides of the present invention preferably have a specific surface area (SBET) comprised between 40 and 50 $m^2/g$, after calcination at 1100° C. for 4 hours under air.

Mixed oxides of the present invention may also have an average pore diameter in number comprised between 20 and 50 nm, preferably comprised between 20 and 40 nm, after calcination at 1000° C. for 4 hours under air.

Mixed oxides of the present invention may have a total pore volume comprised between 0.2 and 0.5 mL/g, preferably comprised between 0.3 and 0.4 mL/g, after calcination at 1000° C. for 4 hours under air.

The total pore volume and pore diameter may be measured by ordinary $N_2$ porosimetry. It mainly consists in a gas adsorption method determination of pore size distribution, using capillary condensation phenomenon and the principle of equivalent substitution volume.

Specific surface and pore size analyzer used may be Tristar II (3020) from Micrometrics. It is notably possible to proceed first with a degasing of the sample as follow: installation of the sample tubes to outgas stations, open the vacuum degassing valve, heating temperature set at 90° C. first, heating 15 min, and then set the heating temperature at 200° C., degassing 1 h. The standard pressure for the vacuum degassing is below 0.05 mbar. After cooling down, the analysis starts.

By way of indication here, and throughout the description, the indicated porosities are measured by nitrogen intrusion porosimetry in accordance with the ASTM D 4284 (1983) standard (Standard method for determining pore volume distribution of catalysts by mercury intrusion porosimetry). ASTM given refers to mercury whereas the porosity given is $N_2$ porosity.

The porosity measurement method given above makes it possible to obtain, in a known manner for pore diameters comprised between 1 and 200 nm, pore size plots giving the pore volume as a function of the pore size ($V=f(d)$, V denoting the pore volume and d denoting the pore diameter). From this pore size plot it is possible to obtain, again in a known manner, a curve (C) giving the derivative $dV/d \log D$. This curve has one peak according to the diameter of the pores, corresponding to: the maximum volume generated by the pores of the material at a certain pore diameter.

Mixed oxides of the present invention are preferably constituted of crystallites having an average size comprised between 12 and 18 nm after calcination at 1000° C. for 4 hours, under air; preferably comprised between 13 and 16 nm.

The average size of the crystallites may be determined by the X-ray diffraction (XRD) technique. The value measured by XRD corresponds to the size of the coherent range calculated based on the breadth of the two most intense diffraction lines and using the Scherrer model.

Compositions of the present invention may also comprise various possible additives such as pH controller and dispersant agent.

According to an embodiment, the mixed oxide exhibits an improved resistance to aging which can be described through a ratio K which is disclosed below and which is measured from a temperature programmed reduction curve (TPR).

The TPR makes it possible to assess the redox properties of a catalyst. In this technique, the volume of hydrogen consumed by a sample, at a controlled temperature, under an atmosphere of a reducing gas containing hydrogen, the proportion of which is carefully controlled. The aged catalyst is placed in a reactor made of quartz. The device used for the TPR comprises a series of solenoid valves to control the injection of gases in the lines, a series of redirection valves to guide the gases, a reactor made of quartz (U form) containing the sample and linked to the lines of gases (down-flow reactor, the temperature is measured by a thermocouple inside the reactor), a furnace in which the reactor is placed, a water trap and a thermal conductivity detector (TCD) which measures the thermal conductivity of the gas at the outlet of the reactor. The device Autochem 2920 commercialized by Micromeritics may be used.

The TPR curve gives the intensity of the signal of the conductivity thermal detector as a function of the temperature of the sample. The area between the curve and a baseline is calculated, the baseline being the line drawn from the point on the curve at 30° C., parallel to the x-axis. With the help of a calibration curve of the TCD, the area is converted into the hydrogen volume.

The TPR is conducted on a catalyst in the form of a powder, consisting of a dispersion of rhodium oxide on the mixed oxide, in a proportion of rhodium of 0.1% by weight, this proportion being calculated as the weight of rhodium based on the weight of the mixed oxide (i.e. 0.1 part by weight of rhodium per 100 parts of mixed oxide). The catalyst which is tested is aged under severe conditions which are disclosed below.

The catalyst is prepared by excess impregnation of the mixed oxide with an aqueous solution of nitrate of $Rh^{III}$, drying and calcination under air at 500° C. for 4 hours. The mixed oxide which can be used is in the form of a powder, the median diameter $d_{50}$ determined by laser diffraction (volume distribution) is between 1 and 20 μm. The powder of the catalyst exhibits a calibrated size. To do so, only the fraction of the catalyst having passed through a sieve of 250 μm, then retained by a sieve of 125 μm is retained. To prepare the powder of the catalyst, the solid obtained at the end of the calcination step at 500° C. can be compacted in the form of a tablet, and the compacted tablet can be ground. The compaction can preferably be performed under a pressure between 3500 and 4000 bar. Another method to prepare the powder of the catalyst can also consist in the granulation of the solid obtained at the end of the calcination step at 500° C., and in grinding the granulated powder.

The aging of the catalyst is performed on 1.0 g of the catalyst in a sequence of three steps $E_1$-$E_3$ detailed below:

$E_1$: the catalyst (1.0 g) is heated under $N_2$ from the ambient temperature to 145° C. (temperature increase rate: 5° C./min), then from 1450° C. to 1100° C. (temperature increase rate: 8.55° C./min) under an atmosphere of $H_2O$ (10%), $O_2$ (10%) and $N_2$ (80%), with a volume flow rate of 24 L/h;

when the temperature reaches 1100° C., $E_2$ starts: the catalyst is then heated for 6 hours at 1100° C. under an atmosphere of $H_2O$ (10%) and $N_2$ (90%), with a volume flow rate of 24 L/h, in which $O_2$ (0.65 L/h) and CO (0.65 L/h) are alternatively injected, with a frequency of 1 injection every 90 s;

after 6 hours, $E_2$ is completed and $E_3$ starts: the catalyst is cooled from 1100° C. to the ambient temperature under an atmosphere which depends on the temperature:

from 1100° C. to 780° C. (temperature decrease rate: 20° C./min), the atmosphere and the alternating injections of $O_2$ and CO of step E2 are maintained;

then from 780° C. to 700° C. (temperature decrease rate: 10° C./min), the atmosphere is a mixture $H_2O$ (10%), $O_2$ (10%) and $N_2$ (80%) and the volume flow rate is 24 L/h;

from 700° C. to 450° C. (temperature decrease rate: 6° C./min), the atmosphere is a mixture $O_2$ (10%) and $N_2$ (90%) with a volume flow rate of 21.5 L/h;

then from 450° C. to the ambient temperature (with no control of the temperature), the atmosphere is $N_2$ with a volume flow rate of 21.0 L/h.

The severe aging mimics the severe conditions that a catalyst withstands when in contact with hot gases in the exhaust line. Step $E_1$ is meant to bring the sample to the critical temperature of 1100° C. in the presence of steam which is always present in exhaust gases. The atmosphere used is nor lean nor rich to avoid any preconditioning or bias of the sample.

With step $E_2$, the catalyst is exposed to an atmosphere which switches alternatively from lean to rich. This step mimics the conditions which correspond to the deactivation of the active species (here, Rh) and is the key step of the aging. This mechanism is known as "fuel-cut aging" and is described in the SAE paper 2014-01-1504 ("a comparison of fuel-cut aging during retardation and fuel-cut during acceleration"). This mechanism can be found when the catalyst is under severe conditions for instance at high speed. During the acceleration phase, the engine requires more fuel and the atmosphere in contact with the catalyst is rich in CO and in unburnt hydrocarbons (HC). At the end of the acceleration phase, the engine requires a lesser amount of fuel and the atmosphere in contact with the catalyst is richer in $O_2$. The presence of $O_2$ and of CO/HC adsorbed on the catalyst brings about a rapid oxidation, and also an exothermy. The exothermy can deteriorate and oxidize the precious metal. To mimic the switch of the atmosphere in contact with the catalyst, step $E_2$ is characterized by alternative switches of injections of $O_2$ and CO, the duration of each injection being 90 s.

Step $E_3$ is similar to step $E_1$ in that the catalyst is cooled down in a controlled manner without modifying the catalytic species on the surface of the catalyst.

The mixed oxide of the invention is also characterized by ratio K which is defined by:

$$K = V_{H2}/\% \ Ce \times 100$$

wherein:

$V_{H2}$ is the volume of hydrogen, in mL of hydrogen per g of catalyst, consumed between 30 and 180° C. by the aged catalyst, determined from the TPR, the TPR being performed under a reducing atmosphere of $H_2$ (10%) and Ar (90%) at a volume flow rate of 30 mL/min, the temperature increasing from the ambient temperature to 850° C. at a temperature increase rate of 10° C./min;

% Ce is the weight proportion of cerium in the mixed oxide, expressed as oxide.

Ratio K is preferably superior or equal to 10.0%, more preferably superior or equal to 12.0%, particularly superior or equal to 15.0%.

Ratio K, expressed in ml of hydrogen/g $CeO_2$ represents the volume of hydrogen based on the amount of cerium present in the mixed oxide. K makes it possible to compare the reducibility of the aged catalysts with different cerium proportions. Thus, the higher K, the higher the volume of hydrogen consumed between 30 and 180° C., the more active the catalyst. This reflects a reducibility to "low" temperature even after a severe aging, attributed to maintaining a good interaction between the precious metal (Rh) and the mixed oxide.

$T_{max}$ is the temperature of the point on the TPR curve with the highest intensity in the range 30-850° C. The mixed oxide of the invention is such that the aged catalyst exhibits a $T_{max}$ inferior or equal to 250° C., preferably inferior or equal to 200° C. This corresponds to a reducibility at "low" temperature despite the severe aging, which can be explained by a maintained strong interaction between the precious metal (Rh) and the mixed oxide despite the severe aging.

Process

In step (a) a reaction occurs between a basic compound and an aqueous solution comprising at least a zirconium chloride salt, a cerium salt, and optionally at least one rare earth salt, other than cerium salt and lanthanum salt, said aqueous solution containing sulphate anion ($SO_4^{2-}$), to form a hydroxide precipitate.

The cerium salt may be cerium nitrate, chloride, sulfate, phosphate or carbonate, and also mixtures of these salts, such as mixed nitrates/chlorides. Cerium salt may be composed of cerium (III) salt and optionally cerium (IV) salt. Cerium salts are ionic compounds usually resulting from the neutralization reaction of an acid and a base or dissolution of a cerium compound, such as cerium hydroxide, with an acid. They are composed of cerium cations and anions so that the product is electrically neutral.

The rare earth salt may be for example a nitrate, chloride, sulfate, phosphate, acetate or carbonate, such as praseodymium nitrate, and neodymium nitrate, yttrium(III) chloride ($YCl_3$) or yttrium nitrate ($Y(NO_3)_3$). The solution of the invention may also comprise one or several rare earth salts.

The zirconium chloride salt is preferably $ZrOCl_2$.

The aqueous solution may comprise 0.5-2 mole of sulphate anion ($SO_4^{2-}$) per mole of zirconium and cerium elements. This ratio $SO_4^{2-}/(Zr+Ce)$ is preferably in the range 0.7-1.5. Sulphate anions may be provided by addition of sulphuric acid or sulphuric salt in the reaction medium.

The aqueous solution can be degassed beforehand with an inert gas. It is notably possible to put the aqueous solution in contact with the inert gas. This contacting may consist, for example by circulating the inert gas above the aqueous solution or by injecting the inert gas into the aqueous solution to reach saturation of said aqueous solution in inert gas. By "inert gas" or "inert atmosphere" is meant for the present description, a gas or an oxygen-free atmosphere which may for example be nitrogen or argon. The contacting may be a bubbling inert gas into the solution. The term "inert gas" or "inert atmosphere" is intended to mean, for the present description, an atmosphere or a gas free of oxygen, it being possible for the gas to be, for example, nitrogen or argon. Contacting may also be made by bubbling.

Products of the hydroxide type can in particular be used as basic compounds. Mention may be made of alkali metal or alkaline earth metal hydroxides and aqueous ammonia. Secondary, tertiary or quaternary amines can also be used. This basic compound may be for example sodium hydroxide, potassium hydroxide, an aqueous ammonia solution, ammonia gas, or mixtures thereof, with an aqueous ammonia solution being preferred. The amount of the basic compound may easily be decided by tracing the pH change of the solution. Usually, a sufficient amount is such that the pH of the solution is not lower than 7, and a preferred amount is such that the pH is between 7 and 11.

To perform the reaction in step (a), the bringing into contact can be carried out in any order of introducing the reactants. However, it is preferable to introduce the solution into a medium containing the base. This reaction may be carried out under an inert atmosphere, notably either in a closed reactor or in a semi-closed reactor with sweeping with the inert gas. The bringing into contact is generally carried out in a stirred reactor.

This step is generally carried out at a temperature comprised between 5 and 50° C.

In step (b) separation of the liquid medium from the precipitate may be carried out, for example, by Nutsche filter method, centrifuging, filter pressing, or decantation. The precipitate may optionally be washed with water. Washing may notably permit to decrease amount of ions, such as $SO_4^{2-}$, $Na^+$ and $Cl^-$ ions, notably to an amount inferior or equal to 500 ppm for each of these ions, preferably inferior or equal to 300 ppm, the ppm being expressed as the weight amount of each ion in the solid precipitate expressed as oxide. Further, the precipitate may optionally be dried, notably at a temperature comprised between 40 and 80° C.

In step (c) the solid obtained in step (b) is heated, in an aqueous medium and optionally in presence of lanthanum salt.

Lanthanum salt is preferably chosen in the group consisting of nitrate, chloride, sulfate, phosphate or carbonate, preferably nitrate.

This thermal treatment consists in heating the medium and in maintaining it at a temperature which is generally comprised between 60° C. and 200° C., and more particularly between 95° C. and 150° C. The duration of this treatment can be between 1 hour and 4 hours.

This treatment must be also carried out under an inert atmosphere, the description with respect to this atmosphere for the step (a) being applied similarly here. Similarly the treatment may be carried out in a stirred reactor.

After the thermal treatment a washing may be carried out on the obtained mixed hydroxides. The washing can be carried out in various ways with or without solid/liquid separation. It can thus be carried out by separating the solid particles from the liquid phase, for example by frontal filtration, settling out or centrifugation. The solid obtained is then resuspended in an aqueous phase. The process can also be carried out by tangential filtration. This washing can be optionally repeated if necessary, for example until a given conductivity of the suspension is obtained, whereby the conductivity measures the amount of impurities present in this suspension.

In an optional step (d), it is notably possible to add lanthanum salt, notably in liquid or solid form. Lanthanum salts are the same as previously defined. It has to be noticed that all lanthanum salts may be added in step (c) or rather all lanthanum salt may be added in step (d). It is also possible to add a portion of lanthanum salts in step (c) and an other portion of lanthanum salts in step (d).

In step (e), an organic texturing agent is added to the suspension obtained in the preceding step (c).

An organic texturing agent usually refers to an organic compound, such as a surfactant, able to control the porous structure, notably the mesoporous structure, of the mixed oxide. "Mesoporous structure" basically describes a structure which specifically comprises pores with a diameter comprised between 2 and 50 nm, described by the term "mesopores".

Typically, these structures are amorphous or crystalline compounds in which the pores are generally distributed in random fashion, with a very wide pore-size distribution.

The organic texturing agent may be added directly or indirectly. It can be added directly to the suspension resulting from the preceding step. It can also be first added in a composition, for instance comprising a solvent of the organic texturing agent, and said composition being then added to the suspension previously obtained.

The amount of organic texturing agent used, expressed as percentage by weight of additive relative to the weight of composition obtained after the calcination step (g), is generally between 5 and 100% and more particularly between 15 and 60%.

The organic texturing agent may be adsorbed on the surface of secondary particles and primary particles of the precipitates. For instance, the organic texturing agent adsorbed on the primary particles will lead to increase the size of mesopores and pore volume of the precipitate.

Organic texturing agents are preferably chosen in the group consisting of: anionic surfactants, nonionic surfactants, polyethylene glycols, carboxylic acids and their salts, and surfactants of the carboxymethylated fatty alcohol ethoxylate type. With regard to this additive, reference may be made to the teaching of application WO-98/45212 and the surfactants described in this document may be used.

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates.

As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammonium.

By way of example, mention may be made more particularly of lauric acid and ammonium laurate.

Finally, it is possible to use a surfactant which is selected from those of the carboxymethylated fatty alcohol ethoxylate type.

The expression "product of the carboxymethylated fatty alcohol ethoxylate type" is intended to mean products consisting of ethoxylated or propoxylated fatty alcohols comprising a $CH_2$—COOH group at the end of the chain.

These products may correspond to the formula:

$$R_1\text{—O—}(CR_2R_3\text{—}CR_4R_5\text{—O})_n\text{—}CH_2\text{—COOH}$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$—$CH_2$—O— groups.

In step (f) the precipitate is separated off from the liquid medium, for example, by Nutsche filter method, centrifuging, or filter pressing. The precipitate may optionally be washed with an aqueous solution, preferably with water at basic pH, for example aqueous ammonia solution. Further, the precipitate may optionally be dried to a suitable extent for improving the efficiency in the following step.

In step (g), the precipitate obtained in the preceding step is calcined to obtain the composition of the invention. The calcination temperature may suitably be selected from the range of usually between 250 and 900° C. The selection of the temperature may be made as desired, depending on the required values of the specific surface area and bulk density. From a practical point of view to prepare a catalyst or a catalyst support wherein the specific surface area is important, the calcination temperature in step (g) may preferably be between 250 and 1100° C., more preferably between 500 and 1000° C. The duration of calcination may suitably be determined depending on the temperature, and may preferably be between 1 and 20 hours.

After step (g), the composition as obtained may be ground or pulverized. The pulverization may sufficiently be performed in an ordinary pulverizer, such as a hammer mill, to obtain a powder of a desired particle size. The composition obtained by the present method may be given a desired particle size through the above mentioned pulverization. A preferred average particle size of the composition is between 0.5 and 50 µm.

At the end of the steps which have been described, it is possible to treat the composition which has been obtained in a known deagglomeration apparatus such as an apparatus of ultrasonic treatment, of double impact jet treatment or a wet milling apparatus.

The inventions also concerns a mixed oxide obtainable by the process disclosed above.

The process is also illustrated in the examples 1-10 given below. Other characteristics, details and advantages of the invention will emerge even more fully upon reading the description which follows.

Applications

According to an embodiment of the present invention, the invention also concerns a catalytic system comprising at least the composition of the invention. The invention also concerns a coating, also called washcoat, comprising at least the composition of the invention. The washcoat generally is coated onto a base, often made of ceramic or metal, and a noble metal is deposited on the washcoat. This coating may be obtained by mixing the composition with a support, so as to form a suspension which can subsequently be deposited on a substrate.

These catalytic systems and more particularly the composition of the invention can have several applications. They are particularly well suited to, and thus usable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion, oxidation of CO, purification of air by low-temperature oxidation ($<200°$ C., indeed even $<100°$ C.), catalytic oxidation of the soot emitted by internal combustion engines, such as diesel engines or petrol engines operating under lean burn conditions.

In the case of these uses in catalysis, the composition of the invention can be employed in combination with precious metals. The nature of these metals and the techniques for the incorporation of the latter in these compositions are well known to a person skilled in the art. For example, the metals can be platinum, rhodium, palladium, gold or iridium and they can, in particular, be incorporated in the compositions by impregnation.

Among the uses mentioned, the treatment of exhaust gases from internal combustion engines (automobile afterburning catalysis) is a particularly advantageous application.

For this reason, the invention also relates to a process for the treatment of exhaust gases from internal combustion engines, which is characterized in that use is made of a catalytic system as described above.

Another advantageous use is the purification of air at temperatures of less than $200°$ C., indeed even of less than $100°$ C., this air comprising at least one compound of the carbon monoxide, ethylene, aldehyde, amine, mercaptan or ozone type and generally of the type of the volatile organic compounds or atmospheric pollutants, such as fatty acids, hydrocarbons, in particular aromatic hydrocarbons, and nitrogen oxides (for the oxidation of NO to give $NO_2$), and of the malodorous compounds type.

The present invention also concerns then a process for the purification of air, said air notably comprising carbon monoxide, ethylene, aldehyde, amine, mercaptan, ozone, volatile organic compounds, atmospheric pollutants, fatty acids, hydrocarbons, aromatic hydrocarbons, nitrogen oxides or malodorous compounds, comprising the step of bringing into contact gases with the catalytic system of the invention. Mention may more particularly be made, as compounds of this type, of ethanethiol, valeric acid and trimethylamine. This treatment is carried out by bringing the air to be treated into contact with the composition of the invention or a catalytic system as described above or obtained by the processes described in detail above.

The following examples are included to illustrate embodiments of the invention. Needless to say, the invention is not limited to described examples.

EXPERIMENTAL PART

Comparative Example 1

ZCL 65/30/5

This example relates to the preparation of a composition containing zirconium oxide, cerium oxide, and lanthanum oxide, in the following respective proportions as weight percentage of the oxides: 65%-30%-5%.

324 ml of water was introduced into a first beaker with 111 mL of an aqueous solution of zirconium nitrate ZrO $(NO_3)_2$ ($[ZrO_2]=292$ g/L and d=1.451 kg/L) and 58.6 mL of an aqueous solution of cerium nitrate $Ce^{IV}$ ($[CeO_2]=256$ g/L and d=1.436 kg/L) and 5.5 mL of an aqueous solution of lanthanum nitrate ($[La_2O_3]=454$ g/L and d=1.687 kg/L).

A solution of aqueous ammonia (12 mol/L) is introduced, with stirring, into a reactor equipped with an inclined-blade stirring rotor and the volume is then made up with distilled water so as to obtain a total volume of 0.5 liter and a stoichiometric excess of aqueous ammonia of 40% relative to the cations to be precipitated.

The solution of nitrates is introduced, over the course of 60 minutes, into the reactor stirred at a speed of 500 rpm. The resulting precipitate suspension is placed in a stainless steel autoclave equipped with a stirring rotor. The temperature of the medium is brought to $150°$ C. for 2 hours with stirring. After cooling to a temperature lower than $60°$ C., 33 grains of lauric acid are added to the resulting suspension. The suspension is kept stirring for 1 hour.

The suspension is then filtered through a Büchner funnel, and then washed with aqueous ammonia solution. The product obtained is then calcined at $700°$ C. for a hold of 4 hours.

Comparative Example 2

ZCL 65/30/5

This example relates to the preparation of a composition containing zirconium oxide, cerium oxide, and lanthanum oxide, in the following respective proportions as weight percentage of the oxides: 65%-30%-5%.

Two solutions of nitrates were prepared beforehand, one consisting of cerium nitrate and zirconium nitrate and the other of lanthanum nitrate. 324 ml of water was introduced into a first beaker with 111 mL of an aqueous solution of zirconium nitrate $ZrO(NO_3)_2$ ($[ZrO_2]=265$ g/L and d=1.408 kg/L) and also 58.5 mL of an aqueous solution of cerium nitrate CeIV ($[CeO_2]=270$ g/L and d=1.43 kg/L). 5.5 mL of an aqueous solution of lanthanum nitrate ($[La_2O_3]=454$ g/L and d=1.687 kg/L) was introduced into a second beaker.

A solution of aqueous ammonia (12 mol/L) is introduced, with stirring, into a reactor equipped with an inclined-blade stirring rotor and the volume is then made up with distilled water so as to obtain a total volume of 0.5 liter and a stoichiometric excess of aqueous ammonia of 40% relative to the cations to be precipitated. The two solutions previously prepared are kept constantly stirring.

The first solution of nitrates is introduced, over the course of 45 minutes, into the reactor stirred at a speed of 500 rpm, the second solution of nitrates is introduced over the course of 15 minutes and the stirring is fixed at 250 rpm. The resulting precipitate suspension is placed in a stainless steel autoclave equipped with a stirring rotor. The temperature of the medium is brought to 150° C. for 2 hours with stirring. After cooling to a temperature lower than 60° C., 33 grains of lauric acid are added to the resulting suspension. The suspension is kept stirring for 1 hour.

The suspension is then filtered through a Büchner funnel, and then washed with aqueous ammonia solution. The product obtained is then calcined at 700° C. for a hold of 4 hours.

Comparative Example 3

ZCL 65/30/5

This example relates to the preparation of a composition based on cerium, zirconium, lanthanum in the respective proportions by weight of oxide of 30%, 65%, 5%.

First we prepared a cochloride solution with 87.5 liters of water and 12.9 liters of an aqueous solution of $CeCl_3$ ([C]=1.53 mol/L and density 1.33 kg/L), we add also 2.42 liters of an aqueous solution of $LaCl_3$ ([C]=1.44 mol/L and density 1.29 kg/L) and 10.6 liters of an aqueous solution of $ZrOCl_2$ (36.2 wt % $ZrO_2$ LOI (loss of ignition) 63.6%). This solution is then precipitated in 1 hour by adding 106 liters of an aqueous solution of NaOH (10.8% wt density; 1.099 kg/L). After precipitation we heat up to 98° C. during 1 hour. We washed the slurry in order to remove the chloride and sodium ions. After repulping, we added 3.7 kg of lauric acid under stirring for 1 hour. Suspension was then filtered and calcined at 700° C. for 3 hours.

Comparative Example 4

ZCY 55/30/15

This example relates to the preparation of a composition containing zirconium oxide, cerium oxide, and yttrium oxide, in the following respective proportions as weight percentage of the oxides: 55%-30%-15%.

Two solutions of nitrates were prepared beforehand, one consisting of cerium nitrate and zirconium nitrate and the other of yttrium nitrate. 3.93 liters of water was introduced into a first beaker with 1.96 liters of an aqueous solution of zirconium nitrate $ZrO(NO_3)_2$ ([$ZrO_2$]=280 g/L and d=1.45 mol/L) and also 1.1 liter of an aqueous solution of cerium nitrate CeIV ([$CeO_2$]=275 g/L and d=1.43 kg/L). 0.75 liter of an aqueous solution of yttrium nitrate ([$Y_2O_3$]=200 g/L and d=1.42 kg/L) and 0.5 liter of water was introduced into a second beaker.

A solution of aqueous ammonia (12 mol/L) is introduced, with stirring, into a reactor equipped with an inclined-blade stirring rotor and the volume is then made up with distilled water so as to obtain a total volume of 0.5 liter and a stoichiometric excess of aqueous ammonia of 40% relative to the cations to be precipitated. The two solutions previously prepared are kept constantly stirring.

The first solution of nitrates is introduced, over the course of 45 minutes, into the reactor stirred at a speed of 500 rpm, the second solution of nitrates is introduced over the course of 15 minutes and the stirring is fixed at 250 rpm. The resulting precipitate suspension is placed in a stainless steel autoclave equipped with a stirring rotor. The temperature of the medium is brought to 150° C. for 2 hours with stirring. After cooling down to a temperature below 60° C., 33 grains of lauric acid are added to the resulting suspension. The suspension is kept stirring for 1 hour.

The suspension is then filtered through a Büchner funnel, and then washed with aqueous ammonia solution. The product obtained is then calcined at 700° C. for a hold of 4 hours.

Comparative Example 5

ZCLY 48/22/15/15

This example relates to the preparation of a composition containing zirconium oxide, cerium oxide, lanthanum and yttrium oxide, in the following respective proportions as weight percentage of the oxides: 48%-22%-15%-15%.

Two solutions of nitrates were prepared beforehand, one consisting of cerium nitrate and zirconium nitrate and the other of lanthanum and yttrium nitrate. 3.78 liters of water was introduced into a first beaker with 1.71 liters of an aqueous solution of zirconium nitrate $ZrO(NO_3)_2$ ([$ZrO_2$]=285 g/L and d=1.4 kg/L) and also 0.8 liter of an aqueous solution of cerium nitrate $Ce^{IV}$ ([$CeO_2$]=275 g/L and d=1.43 kg/L). 0.75 liter of an aqueous solution of yttrium nitrate ([$Y_2O_3$]=200 g/L and d=1.42 kg/L) and 0.5 liter of an aqueous solution of lanthanum nitrate ([$La_2O_3$]=300 g/L and d=1.6 kg/L) was introduced into a second beaker.

An aqueous solution of ammonia (12 mol/L) is introduced, with stirring, into a reactor equipped with an inclined-blade stirring rotor and the volume is then made up with distilled water so as to obtain a total volume of 0.5 liter and a stoichiometric excess of aqueous ammonia of 40% relative to the cations to be precipitated. The two solutions previously prepared are kept constantly stirring.

The first solution of nitrates is introduced, over the course of 45 minutes, into the reactor stirred at a speed of 500 rpm, the second solution of nitrates is introduced over the course of 15 minutes and the stirring is fixed at 250 rpm. The resulting precipitate suspension is placed in a stainless steel autoclave equipped with a stirring rotor. The temperature of the medium is brought to 150° C. for 2 hours with stirring. After cooling down to a temperature lower than 60° C., 33 grains of lauric acid are added to the resulting suspension. The suspension is kept stirring for 1 hour.

The suspension is then filtered through a Büchner funnel, and then washed with aqueous ammonia solution. The product obtained is then calcined at 700° C. for a hold of 4 hours.

Comparative Example 6

ZC 58/42

This example relates to the preparation of a composition containing zirconium oxide and cerium oxide in the following respective proportions as weight percentage of the oxides: 58%-42%.

2.54 liters of water was introduced into a first beaker with 1.71 liters of an aqueous solution of zirconium nitrate $ZrO(NO_3)_2$ ([$ZrO_2$]=280 g/L and d=1.451 kg/L) and 1.26 liters of an aqueous solution of cerium nitrate CeIV ([$CeO_2$]=275 g/L and d=1.7 kg/L).

An aqueous solution of ammonia (12 mol/L) is introduced, with stirring, into a reactor equipped with an inclined-blade stirring rotor and the volume is then made up with distilled water so as to obtain a total volume of 0.5 liter and a stoichiometric excess of aqueous ammonia of 40% relative to the cations to be precipitated.

The solution of nitrates is introduced, over the course of 60 minutes, into the reactor stirred at a speed of 500 rpm. The resulting precipitate suspension is placed in a stainless steel autoclave equipped with a stirring rotor. The temperature of the medium is brought to 150° C. for 2 hours with stirring. After cooling down to a temperature lower than 60° C., 33 grains of lauric acid are added to the resulting suspension. The suspension is kept stirring for 1 hour.

The suspension is then filtered through a Büchner funnel, and then washed with aqueous ammonia solution. The product obtained is then calcined at 700° C. for a hold of 4 hours.

Example 1

ZCL 65/30/5

This example relates to the preparation of a composition based on cerium, zirconium, lanthanum in the respective proportions by weight of oxide of 30%, 65%, 5%.

First we prepared a cochloride solution, first one with 19 liters of water and 16.7 liters of an aqueous solution of $CeCl_3$ ([C]=1.53 mol/L and density 1.33 kg/L), and we added 15.2 kg of an aqueous solution of $ZrOCl_2$ (36.2 wt % $ZrO_2$ LOI 63.6%) we added after 65 liters of an aqueous solution of sulfuric acid (8.77 wt % and density 1.05 kg/L). We have transferred then in 50 min this solution in a precipitation tank preloaded with 103 liters of an aqueous solution of NaOH (10.8% wt; density 1.099 kg/L). The agitation speed during the precipitation was at 220 rpm. We washed the slurry by filtration and repulped it in order to remove the $SO_4^{2-}$, $Na^+$ and $Cl^-$ ions below 200 ppm for each ions. After repulping, we aged the slurry at 125° C. during 1 hour at 80 g/L. After aging, $La(NO_3)_3$ was introduced in order to get in the final oxide 5% wt of $La_2O_3$. We added 3.5 kg of lauric acid under stirring for 1 hour. Suspension was then filtered and calcined at 700° C. for 3 hours.

Example 2

ZCLY 50/40/5/5

This example relates to the preparation of a composition based on cerium, zirconium, lanthanum and yttrium in the respective proportions by weight of oxide of 40%, 50%, 5%, 5%.

First we prepared a solution, with 21 liters of water and 12.53 liters of an aqueous solution of $CeCl_3$ ([C]=1.53 mol/L and density 1.33 kg/L), and we added 20 kg of an aqueous solution of $ZrOCl_2$ (36.2 wt % $ZrO_2$ LOI 63.6%) and we added an aqueous solution of yttrium nitrate in order to get 5% on the final oxide. We added after 59 liters of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 100 liters of an aqueous solution of NaOH (10.8% wt density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 125° C. during 1 hour at 80 g/L. After aging $La(NO_3)_3$ was introduced in order to get in the final oxide 5% wt of $La_2O_3$. We added 3.5 kg of lauric acid under stirring for 1 hour. Suspension was then filtered and calcined at 700° C. for 3 hours.

Example 3

ZCLN 76/15/4/5

This example relates to the preparation of a composition based on cerium, zirconium, lanthanum and neodymium in the respective proportions by weight of oxide of 76%, 15%, 4%, 5%.

First we prepared a solution, with 21 liters of water and 6.27 liters of an aqueous solution of $CeCl_3$ ([C]=1.53 mol/L and density 1.33 kg/L), and we added 23.46 kg of an aqueous solution of $ZrOCl_2$ (36.2 wt % $ZrO_2$ LOI 63.6%) and we added an aqueous solution of neodymium nitrate in order to get 5% on the final oxide. We added after 58 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 100 liters of an aqueous solution of NaOH (10.8% wt density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 80 g/L. After aging $La(NO_3)_3$ was introduced in order to get in the final oxide 4% wt of $La_2O_3$. We added 3.5 kg of lauric acid under stirring for 1 hour. Suspension was then filtered and calcined at 700° C. for 3 hours.

Example 4

ZCLN 64/25/4/7

This example relates to the preparation of a composition based on cerium, zirconium, lanthanum and neodymium in the respective proportions by weight of oxide of 64%, 25%, 4%, 7%.

First we prepared a solution, with 29 liters of water and 10.4 liters of an aqueous solution of $CeCl_3$ ([C]=1.53 mol/L and density 1.33 kg/L), and we added 19.1 kg of an aqueous solution of $ZrOCl_2$ (36.2 wt % $ZrO_2$ LOI 63.6%) and we added an aqueous solution of neodymium nitrate in order to get 5% on the final oxide. We added after 54 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 100 liters of an aqueous solution of NaOH (10.8% wt density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 80 g/L. After aging $La(NO_3)_3$ was introduced in order to get in the final oxide 4% wt of $La_2O_3$. We added 3.5 kg of lauric acid under stirring for 1 hour. Suspension was then filtered and calcined at 700° C. for 3 hours.

US 12,582,966 B2

19

Example 5

ZCLN 66/15/4/15

This example relates to the preparation of a composition based on cerium, zirconium, lanthanum and neodymium in the respective proportions by weight of oxide of 66%, 15%, 4%, 15%.

First we prepared a solution, with 33 liters of water and 6.2 liters of an aqueous solution of $CeCl_3$ ([C]=1.53 mol/L and density 1.33 kg/L), and we added 20.3 kg of an aqueous solution of $ZrOCl_2$ (36.2 wt % $ZrO_2$ LOI 63.6%) and we added an aqueous solution of neodymium nitrate in order to get 15% on the final oxide. We added after 58 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 104 liters of an aqueous solution of NaOH (10.8% wt; density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 80 g/L. After aging $La(NO_3)_3$ was introduced in order to get in the final oxide 4% wt of $La_2O_3$. We added 3.5 kg of lauric acid under stirring for 1 hour. Suspension was then filtered and calcined at 700° C. for 3 hours.

Example 6

ZCLN 73/20/2/15

This example relates to the preparation of a composition based on cerium, zirconium, lanthanum and neodymium in the respective proportions by weight of oxide of 73%, 20%, 2%, 15%.

First we prepared a solution, with 24 liters of water and 8.3 liters of an aqueous solution of $CeCl_3$ ([C]=1.53 mol/L and density 1.33 kg/L), and we added 22.5 kg of an aqueous solution of $ZrOCl_2$ (36.2 wt % $ZrO_2$ LOI 63.6%) and we added an aqueous solution of neodymium nitrate in order to get 15% on the final oxide. We added after 58 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 114 liters of an aqueous solution of NaOH (10.8% wt; density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 80 g/L. After aging $La(NO_3)_3$ was introduced in order to get in the final oxide 2% wt of $La_2O_3$. We added 3.5 kg of lauric acid under stirring for 1 hour. Suspension was then filtered and calcined at 700° C. for 3 hours.

Example 7

ZCLY 60/30/5/5

This example relates to the preparation of a composition based on cerium, zirconium, lanthanum and yttrium in the respective proportions by weight of oxide of 60%, 30%, 5%, 5%.

First we prepared a solution, with 28 liters of water and 12.5 liters of an aqueous solution of $CeCl_3$ ([C]=1.53 mol/L and density 1.33 kg/L), and we added 18.5 kg of an aqueous solution of $ZrOCl_2$ (36.2 wt % $ZrO_2$ LOI 63.6%) and we added yttrium nitrate in order to get 5% on the final oxide. We added after 59 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 114 liters of an aqueous solution of NaOH (10.8% wt; density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 100 g/L. After aging $La(NO_3)_3$ was introduced in order to get in the final oxide 5% wt of $La_2O_3$. We added 3.5 kg of lauric acid under stirring for 1 hour. Suspension was then filtered and calcined at 700° C. for 3 hours.

Example 8

ZCLY 50/30/5/15

This example relates to the preparation of a composition based on cerium, zirconium, lanthanum and yttrium in the respective proportions by weight of oxide of 50%, 30%, 5%, 15%.

First we prepared a solution, with 31 liters of water and 12.5 liters of an aqueous solution of $CeCl_3$ ([C]=1.53 mol/L and density 1.33 kg/L), and we added 15.4 kg of an aqueous solution of $ZrOCl_2$ (36.2 wt % $ZrO_2$ LOI 63.6%) and we added an aqueous solution of yttrium nitrate in order to get 15% on the final oxide. We added after 47.4 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 105 liters of an aqueous solution of NaOH (10.8% wt density 1.099). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 100 g/L. After aging $La(NO_3)_3$ was introduced in order to get in the final oxide 5% wt of $La_2O_3$. We added 3.5 kg of lauric acid under stirring for 1 hour. Suspension was then filtered and calcined at 700° C. for 3 hours.

Example 9

ZCLY 60/24/4/12

This example relates to the preparation of a composition based on cerium, zirconium, lanthanum and yttrium in the respective proportions by weight of oxide of 60%, 24%, 4%, 12%.

First we prepared a solution, with 30 liters of water and 10 liters of an aqueous solution of $CeCl_3$ ([C]=1.53 mol/L and density 1.33 kg/L), and we added 18.5 kg of an aqueous solution of $ZrOCl_2$ (36.2 wt % $ZrO_2$ LOI 63.6%) and we added an aqueous solution of yttrium nitrate in order to get 12% on the final oxide. We added after 51.2 liters of an aqueous solution of sulfuric acid (8.77 wt % and density 1.05 kg/L). After introduction of sulfuric acid we keep under mixing 2 hours the solution before to start the precipitation.

We have transferred then in 50 min this solution in a precipitation tank preloaded with 106 liters of an aqueous solution of NaOH (10.8% wt density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, we aged the slurry at 98° C. during 1 hour at 80 g/L. After aging $La(NO_3)_3$ was introduced in order to get in the final oxide 4% wt of $La_2O_3$. We added 3.5 kg of lauric acid under stirring for 1 hour. Suspension was then filtered and calcined at 700° C. for 3 hours.

Example 10

ZCLY 60/24/4/12

This example relates to the preparation of a composition based on cerium, zirconium, lanthanum and yttrium in the respective proportions by weight of oxide of 60%, 24%, 4%, 12%.

First we prepared a solution, with 30 liters of water and 10 liters of an aqueous solution of $CeCl_3$ ($[C]=1.53$ mol/L and density 1.33 kg/L), and we added 18.5 kg of an aqueous solution of $ZrOCl_2$ (36.2 wt % $ZrO_2$ LOI 63.6%) and we added an aqueous solution of yttrium nitrate in order to get 12% on the final oxide. We added after 51.2 liters of an aqueous solution of sulfuric acid (8.77 wt % and density 1.05 kg/L). After introduction of sulfuric acid we keep under mixing 2 hours the solution before to start the precipitation. We have transferred then in 50 min this solution in a precipitation tank preloaded with 106 liters of an aqueous solution of NaOH (10.8% wt; density 1.099 kg/L). The agitation speed during the precipitation was at 220 rpm. We washed the slurry by filtration and repulped it in order to remove the $SO_4^{2-}$, $Na^+$ and $Cl^-$ below 200 ppm for each ion. After repulping, a solution of $La(NO_3)_3$ was introduced in order to get in the final oxide 4% wt of $La_2O_3$. We aged the slurry at 98° C. during 1 hour at 80 g/L. We added 3.5 kg of lauric acid under stirring for 1 hour. Suspension was then filtered and calcined at 700° C. for 3 hours.

Surface Area (SBET)

Calcinations in air were carried out on the mixed oxides as prepared in the previous examples, at a given temperature and given time. Specific surface areas (SBET) of the mixed oxides were measured by nitrogen adsorption in accordance with standard ASTM D 3663-78 and reported in Table 1.

TABLE 1

| EXAMPLES | MIXED OXIDES | SBET 1000° C./4 h (m²/g) | SBET 1100° C./4 h (m²/g) |
|---|---|---|---|
| C1 | ZCL 65/30/5 wt % | 51 | 23 |
| C2 | ZCL 65/30/5 wt % | 52 | 24 |
| C3 | ZCL 65/30/5 wt % | 45 | 20 |
| C4 | ZCY 55/30/15 wt % | 46 | 29 |
| C5 | ZCLY 48/22/15/15 wt % | 57 | 32 |
| C6 | ZC 58/42 wt % | 40 | 15 |
| 1 | ZCL 65/30/5 wt % | 56 | 41 |
| 2 | ZCLY 50/40/5/5 wt % | 62 | 41 |
| 3 | ZCLN 76/15/4/5 wt % | 64 | 40 |
| 4 | ZCLN 64/25/4/7 wt % | 62 | 43 |
| 5 | ZCLN 66/15/4/15 wt % | 54 | 41 |
| 6 | ZCLN 73/20/2/5 wt % | 55 | 41 |

TABLE 1-continued

| EXAMPLES | MIXED OXIDES | SBET 1000° C./4 h (m²/g) | SBET 1100° C./4 h (m²/g) |
|---|---|---|---|
| 7 | ZCLY 60/30/5/5 wt % | 55 | 43 |
| 8 | ZCLY 50/30/5/15 wt % | 63 | 45 |
| 9 | ZCLY 60/24/4/12 wt % | 66 | 41 |
| 10 | ZCLY 60/24/4/12 wt % | 63 | 41 |

Z: zirconium;
C: cerium;
L: lanthanum;
N: neodymium;
Y: yttrium

It appears then that that the compositions of the present invention have higher thermal resistances in comparison with compositions of the prior art notably as produced by conventional methods.

Preparation of Catalyst and Tests

Preparation of $ZrO_2$ Mixed Oxide (50%)—$CeO_2$ (40%)—$La_2O_3$ (5%)—$Y_2O_3$ (5%)

A solution was prepared from 25 liters of water, 16.7 liters of an aqueous solution of $CeCl_3$ ($[C]=1.53$ mol/L; density 1.33 kg/L), and 15 kg of $ZrOCl_2$ (36.2 wt % $ZrO_2$; LOI 63.6%) which is added to 56 liters of sulfuric acid (8.8% by weight; density 1.05 kg/L). The resulting solution is left stirring for 2 hours.

The solution was poured into a stirred vessel comprising the vessel bottom 100 liters of an aqueous NaOH solution (10.8% by weight, density 1.099 kg/L). Then, an adequate amount of an aqueous solution of yttrium nitrate so as to obtain 5% of yttrium oxide in the final mixed oxide was added in 5 min.

The resulting precipitate was washed by a series of filtrations-redispersion in water to a content of each of $SO_4^{2-}$ ions, $Na^+$ and $Cl^-$ less than 300 ppm. After redispersion in water (dispersion to 80 g/L), the precipitate is heated at 97° C. for 1 hour. Then is added an adequate amount of an aqueous solution of $La(NO_3)_3$ so as to obtain 5% of lanthanum oxide $La_2O_3$ in the final mixed oxide. Then 3.5 kg of lauric acid is added with stirring for 1 hour. The suspension is filtered and the solid is calcined at 750° C. for 3 hours. The solid is then milled to a mean diameter $d_{50}$ of about 4 μm. It exhibits a specific surface of 71 m²/g.

The mixed oxide obtained exhibits the following specific areas:

after calcination at 1000° C. for 4 h: 58 m²/g after calcination at 1100° C. for 4 h: 37 m²/g A catalyst was prepared by impregnation by excess of the mixed oxide as previously obtained with an aqueous solution of $Rh^{III}$ nitrate, drying and calcining in air at 500° C. for 4 h. The mixed oxide is used in powder form with a median diameter $d_{50}$ between 1 and 20 μm. Mixed oxide powder is dispersed in distilled water to obtain a dispersion at 30.0% by weight (was weighed 10.0 g of mixed oxide). A solution of rhodium nitrate (III) in water, whose amount is necessary to obtain the proportion of 0.1% of rhodium, is then added to this dispersion, and the pH is brought to a value of 4 by means of nitric acid. The dispersion was allowed to stir for 1 h, then the product is dried at 120° C. in an oven and the dried solid is calcined in air at 500° C. for 4 h. Whole solid is then compacted in the form of a cylindrical pellet of 32 mm diameter by applying the powder to a pressure of 30 tons for 2 min. The pellet is then deagglomerated in a mortar to give a powder which was sieved so as to retain only the fraction of the powder which passed through a sieve of 250 μm and retained by a sieve of 125 μm.

The aging of the catalyst is performed on 1.0 g of the catalyst in a sequence of three steps $E_1$-$E_3$ as previously detailed. Several parameters are then measured and reported in Table 2.

TABLE 2

| $S_{BET}$ (m²/g)* | $V_{H2}$ (ml/g)** | % Ce*** | K (ml/g) | $T_{max}$ (° C.) |
|---|---|---|---|---|
| 7 | 11.8 | 40.0 | 29.5 | 141 |

*Catalyst surface area after severe aging
**Volume of hydrogen consumed between 30 and 180° C. by the aged catalyst
***Proportion of cerium in % by weight, expressed in terms of CeO₂ oxide

The invention claimed is:

1. A composition comprising a cerium and zirconium based mixed oxide, wherein the mixed oxide consists of zirconium oxide, cerium oxide, lanthanum oxide and optionally at least one rare earth oxide other than cerium oxide and lanthanum oxide, with the following proportions:
5-70% by weight of cerium oxide;
20-80% by weight of zirconium oxide;
1-15% by weight of lanthanum oxide; and
0-20% by weight of at least one rare earth other oxide than cerium oxide and lanthanum oxide;
said mixed oxide exhibiting:
a specific surface area (SBET) comprised between 40 and 50 m²/g, after calcination at 1100° C. for 4 hours under air;
a specific surface area (SBET) comprised between 60 and 70 m²/g, after calcination at 1000° C. for 4 hours under air; and
wherein the mixed oxide is constituted of crystallites having an average size between 12 and 18 nm after calcination at 1000° C. for 4 hours under air.

2. A composition according to claim 1 wherein the rare earth other than cerium and lanthanum is selected from the group consisting of: yttrium, neodymium, and/or praseodymium.

3. A composition according to claim 1, wherein said mixed oxide has a pore diameter comprised between 20 and 50 nm, after calcination at 1000° C. for 4 hours under air.

4. A composition according to claim 1, wherein said mixed oxide has a total pore volume comprised between 0.2 and 0.5 ml/g, after calcination at 1000° C. for 4 hours under air.

5. A catalytic system comprising the composition according to claim 1.

6. A process for the treatment of exhaust gases from internal combustion engines, the process comprising contacting the exhaust gases with the catalytic system according to claim 5.

7. A process for the production of the composition according to claim 1, comprising in this order at least the following steps:
(a) reacting a basic compound with an aqueous solution comprising at least a zirconium chloride salt, a cerium salt and optionally at least one rare earth salt, other than cerium salt and lanthanum salt, said aqueous solution containing sulphate anion ($SO_4^{2-}$), to form a hydroxide precipitate;

(b) separating off the precipitate from the liquid medium;
(c) heating the precipitate obtained in step (b) in an aqueous medium and optionally in presence of lanthanum salt with a basic compound;
(d) adding lanthanum salt, optionally with a basic compound;
(e) adding an organic texturing agent;
(f) separating off the precipitate from the liquid medium; and
(g) calcining the precipitate.

8. A process according to claim 7, wherein in step (a) the aqueous solution comprises 0.5-2 mole of sulphate anion ($SO_4^{2-}$) per mole of zirconium and cerium elements.

9. A process according to claim 7, wherein in step (a) the cerium salt is cerium chloride.

10. A process according to claim 7 wherein in step (e), organic texturing agents are selected from the group consisting of: anionic surfactants, nonionic surfactants, polyethylene glycols, carboxylic acids and their salts, and surfactants of the carboxymethylated fatty alcohol ethoxylate type.

11. A composition comprising a cerium and zirconium based mixed oxide, wherein the mixed oxide consists of zirconium oxide, cerium oxide, lanthanum oxide, hafnium oxide, and optionally at least one rare earth oxide other than cerium oxide and lanthanum oxide, with the following proportions:
5-70% by weight of cerium oxide;
20-80% by weight of zirconium oxide;
1-15% by weight of lanthanum oxide; and
0-20% by weight of at least one rare earth other oxide than cerium oxide and lanthanum oxide;
said mixed oxide exhibiting:
a specific surface area (SBET) comprised between 40 and 50 m²/g, after calcination at 1100° C. for 4 hours under air;
a specific surface area (SBET) comprised between 60 and 70 m²/g, after calcination at 1000° C. for 4 hours under air; and
wherein the mixed oxide is constituted of crystallites having an average size between 12 and 18 nm after calcination at 1000° C. for 4 hours under air.

12. A composition according to claim 11, wherein the hafnium oxide is in an amount of less than 2% by weight.

13. A composition according to claim 11, wherein the hafnium oxide is in an amount of less than 1% by weight.

14. A composition according to claim 11, wherein the rare earth other than cerium and lanthanum is selected from the group consisting of: yttrium, neodymium, and/or praseodymium.

15. A composition according to claim 11, wherein said mixed oxide has a pore diameter comprised between 20 and 50 nm, after calcination at 1000° C. for 4 hours under air.

16. A composition according to claim 11, wherein said mixed oxide has a total pore volume comprised between 0.2 and 0.5 ml/g, after calcination at 1000° C. for 4 hours under air.

* * * * *